United States Patent [19]

Catanzarite

[11] Patent Number: 5,652,704
[45] Date of Patent: Jul. 29, 1997

[54] CONTROLLABLE SEAT DAMPER SYSTEM AND CONTROL METHOD THEREFOR

[75] Inventor: David M. Catanzarite, Erie, Pa.

[73] Assignee: Lord Corporation, Erie, Pa.

[21] Appl. No.: 534,078

[22] Filed: Sep. 12, 1995

[51] Int. Cl.⁶ .................................................. B60N 2/00
[52] U.S. Cl. ........................ 364/424.059; 248/550
[58] Field of Search ................ 364/424.01, 424.05, 364/423.098, 424.054; 280/707; 248/550; 296/65.1

[56] References Cited

U.S. PATENT DOCUMENTS

| | | | |
|---|---|---|---|
| 4,434,468 | 2/1984 | Caddick et al. | 364/424 |
| 4,802,648 | 2/1989 | Decker et al. | 248/550 |
| 4,826,205 | 5/1989 | Kouda et al. | 280/703 |
| 4,896,752 | 1/1990 | Shtarkman | 188/299 |
| 4,913,482 | 4/1990 | Hanai et al. | 296/65.1 |
| 4,941,648 | 7/1990 | Kimura | 267/131 |
| 5,062,497 | 11/1991 | Ogata | 180/300 |
| 5,088,759 | 2/1992 | Takehara et al. | 280/707 |
| 5,160,160 | 11/1992 | Kawabata | 280/707 |
| 5,169,112 | 12/1992 | Boyles et al. | 248/550 |
| 5,197,007 | 3/1993 | Parker | 364/424.05 |
| 5,243,525 | 9/1993 | Tsutsumi et al. | 364/424.05 |
| 5,276,623 | 1/1994 | Wolfe | 364/424.05 |
| 5,277,281 | 1/1994 | Carlson et al. | 188/267 |
| 5,284,330 | 2/1994 | Carlson et al. | 267/140.14 |
| 5,294,085 | 3/1994 | Lloyd et al. | 248/562 |
| 5,333,819 | 8/1994 | Stetson, Jr. | 244/164 |
| 5,346,170 | 9/1994 | Schmidt et al. | 248/550 |
| 5,358,305 | 10/1994 | Kaneko et al. | 296/65.1 |
| 5,374,025 | 12/1994 | Whelpley et al. | 248/550 |
| 5,382,045 | 1/1995 | Takeda et al. | 280/707 |
| 5,383,705 | 1/1995 | Voigt | 297/211 |
| 5,390,121 | 2/1995 | Wolfe | 364/424.05 |
| 5,467,280 | 11/1995 | Kimura | 364/424.05 |
| 5,582,385 | 12/1996 | Boyle et al. | 248/550 |

Primary Examiner—Michael Zanelli

[57] ABSTRACT

A controllable fluid damper is employed in a seat suspension system. A microprocessor receives successive signals from a displacement sensor and computes a rate of displacement. This displacement rate is used to determine an appropriate control signal for the damper to provide the desired isolation of the seat occupant from the vibration input to the frame. A rate control method is disclosed as a preferred control technique for providing the desired isolation, although both the control hardware and method can be used independently.

20 Claims, 5 Drawing Sheets

CONTROLLABLE SEAT DAMPER SYSTEM AND CONTROL METHOD THEREFOR

BACKGROUND AND SUMMARY OF THE INVENTION

The present invention is directed to the field of controllable dampers. More particularly, the present invention is directed to a controllable seat suspension damper system and a method for dynamically controlling such a damper system.

Various seat damper systems have been proposed for use in Class 8 trucks, off-highway equipment, boat seats, automotive and aerospace applications. Most of the systems used to date are passive, i.e., have a coil or air spring with fixed operational characteristics. A compromise must be made in such systems between providing the desired control for high amplitude vibration and providing the desired isolation from high frequency disturbances. Such tuned passive systems can result in poor ride conditions which produce discomfort for the operator and, in some cases, can lead to loss of control of the vehicle.

One controllable seat damper known in the art is described and claimed in U.S. Pat. No. 5,358,305 issued to Kaneko et al. Kaneko et al. employs a hydraulic seat damper with a controllable valve which can be switched between a closed and an open position, limiting the adjustment to a single hard and a single soft position.

The present invention provides a greater degree of control of the damping force the system provides. Since the damper of the present invention employs a controllable fluid and, because of the particular control method implemented, the present invention can provide a continuous control of the output force of the damper system over a significant range. A single position sensor can provide the necessary input to permit the desired adjustment. Null bands avoid transmission of high frequency vibrations to the seat occupant. The use of end stop limits can increase the damping force when the damper is about to bottom (or top) out thereby avoiding the harsh feel of an end stop collision.

By employing any of a number of additional sensors such as a brake sensor, a clutch sensor, seat occupant sensor, gearshift position sensor, steering angle sensor, speed sensor, rollover sensor, additional features can be provided or existing features can be enhanced. A seat leveling switch can be provided to maintain the seat at a desired height. In addition, a manual ride-mode switch may be provided to allow the driver to select the level of damping desired for the type of driving s/he is doing or the particular feel s/he prefers.

Various other features, advantages and characteristics of the device and control method of the present invention will become apparent after a reading of the following detailed description and addended claims.

BRIEF DESCRIPTION OF THE DRAWINGS

The following figures describe preferred embodiments of the apparatus and the control method of the present invention, like elements bearing like reference numerals. The figures detail the invention in which.

DETAILED DESCRIPTION OF THE PREFERRED EMBODIMENTS

Figure 1:
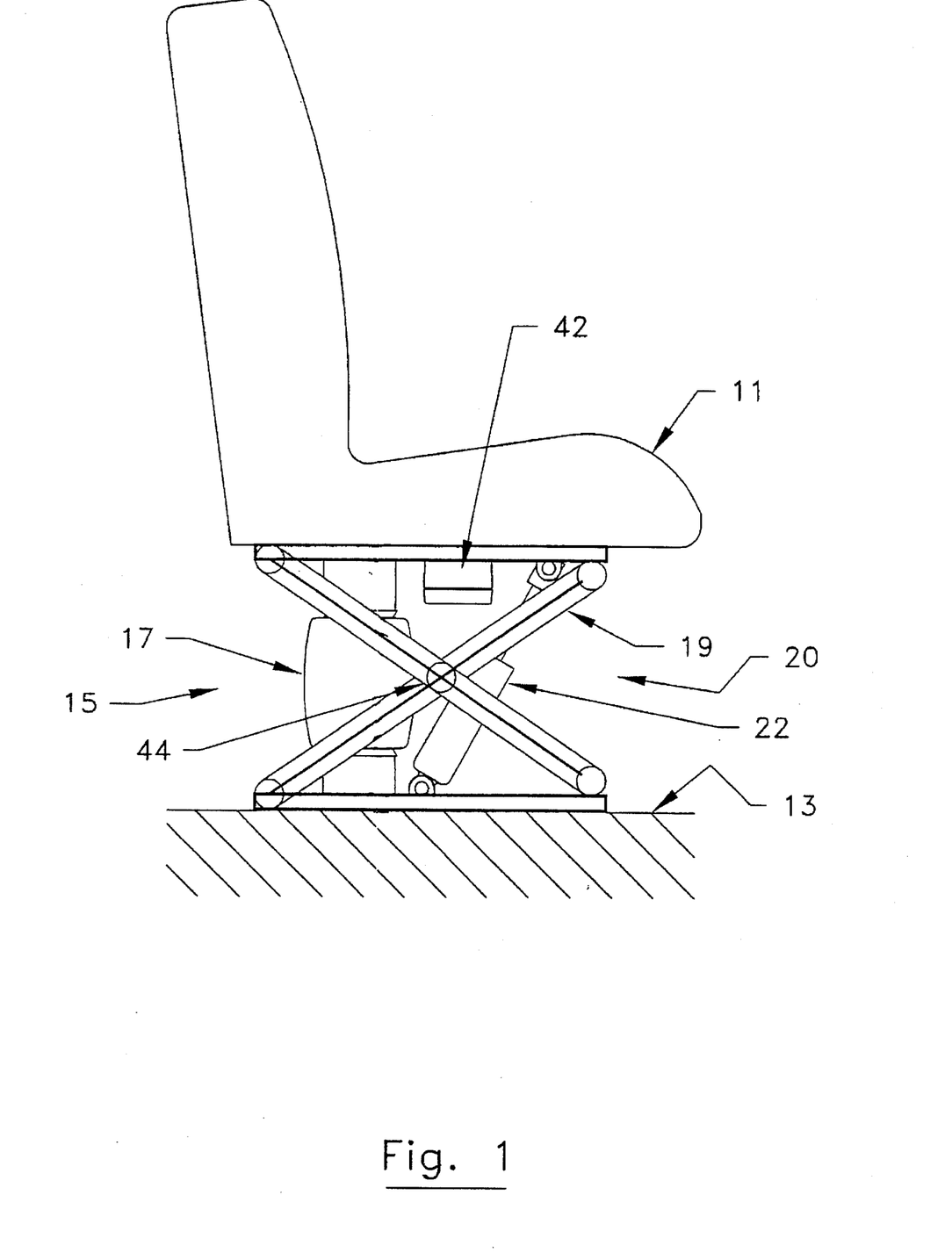
FIG. 1 is schematic side view of the controllable seat suspension system of the present invention.

The controllable seat damper system of the present invention is shown in FIG. 1 generally at 20. Seat 11 is mounted on a frame 13 by a suspension system shown generally at 15. Suspension system 15 includes a spring means 17 and a support means 19, spring means 17 being depicted here as an adjustable air spring and support means 19 being shown as a scissors mount. Obviously, other forms of spring means and support means could be employed. For example, a mechanical coil spring with a motor to adjust its preload could replace the adjustable air spring shown here. The present invention will be described in connection with a truck seat application, although as previously mentioned, the system has broad applicability.

Controllable damper 22 is mounted in parallel with the spring means 17 and support means 19, being connected on one end to seat 11 and on the other to frame (or floor) 13. The purpose of the controllable damper system 20 as integrated into the seat suspension is to isolate the seat 11 and, hence, the passenger from the transmission of vibrational energy from the frame 13. Vehicle frame 13 can, of course, receive vibrational input from a number of high and low frequency sources including road inputs and engine inputs. It is the intention of the present invention to provide an adjustable damper that is capable of improving overall isolation by adjusting the damping force provided to isolate both the high frequency, low amplitude vibrations and damp the low frequency, high amplitude motion.

Figure 2:
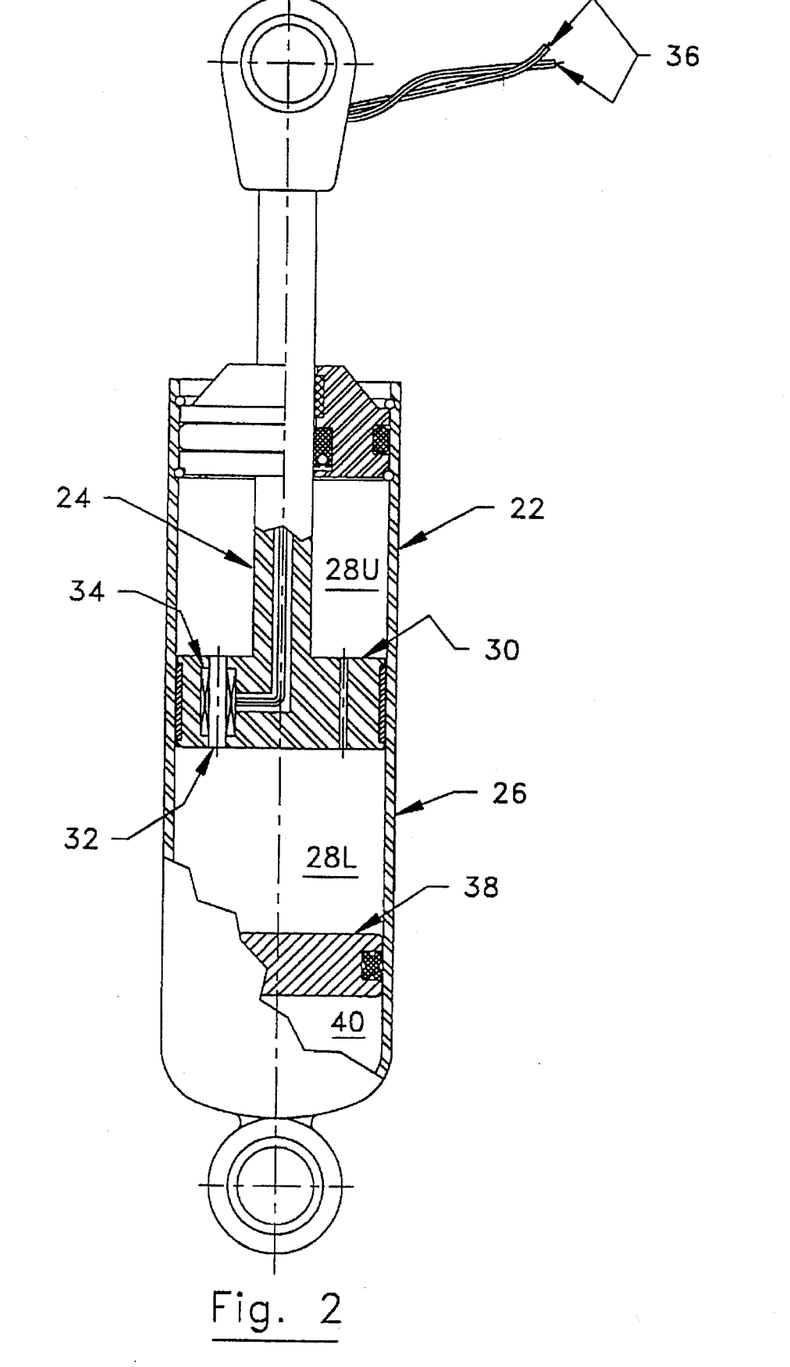
FIG. 2 is enlarged side view with portions broken away of a controllable damper useful in the suspension system of the present invention.

The controllable damper 22 is shown in greater detail in FIG. 2. Damper 22 is a controllable fluid damper and may be of either the electrorheological (ER) or magnetorheological (MR) types but is preferably of the MR fluid varieties described and claimed in U.S. Pat. Nos. 5,277,281 and 5,284,330 which are hereby incorporated by reference. Damper 22 has a piston 24 with a piston head 30 slidable within a cylindrical housing 26 thereby subdividing housing into upper (28U) and lower (28L) chambers which contain a magnetorheological fluid. Piston head 30 has an orifice 32 extending axially therethrough, said orifice 32 being at least partially, and preferably totally, surrounded by a field-inducing coil 34.

When current is circulated through coil 34 by means of leads 36, a magnetic field of a particular strength is produced and the rheological properties of the MR fluid moving to and from chamber 28U from and to chamber 28L are established. When the current is adjusted by current controller 35 (FIG. 3; a linear current amplifier, for example) the fluid rheological properties are changed adjusting the flow rate of said fluid. Accordingly the force generated by the damper 22 is adjusted by changing the rate of current flow and, hence, the field strength of the induced magnetic field affecting the MR fluid. The orifice 32 functions as a valve since a "thickened" fluid will flow more slowly therethrough. Since the flow properties of the MR fluid can be adjusted incrementally over a substantial range, the force achievable by the damper 22 can similarly be adjusted over a substantial range. Damper 22 can be equipped with an auxiliary floating piston 38 which separates the chamber 28L from an end region 40 that can be filled with pneumatic fluid by means of a fill port (not shown). This will serve as an expansion chamber for thermal expansion and contraction of the incompressible fluid, as well as providing space for the fluid displaced by the piston rod.

Figure 3:
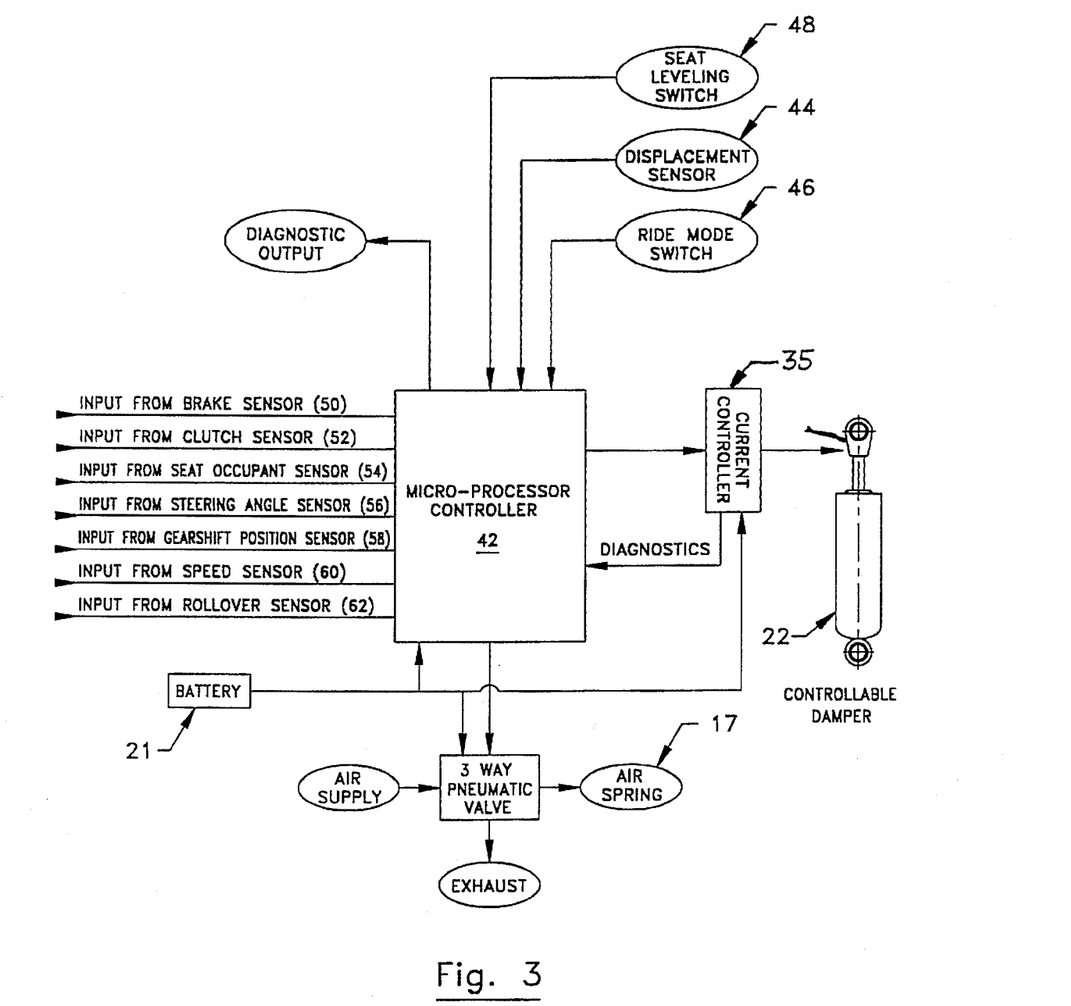
FIG. 3 is schematic of the control system diagramming the direction of data and current flow through the various elements of the wiring harness.

Controller 42 is shown in FIG. 1 attached beneath the seat 11. As seen in FIG. 3, controller 42 is preferably an 8-bit micro-processing computer and a wiring harness operatively interconnects controller 42 to the other components of the system. For some applications, a 4-bit processor will suffice. Every line in FIG. 3 bearing an arrowhead (at either head or tail end) represents a constituent element of the wiring harness. In its most basic form, controllable seat damper system 20 includes a controllable damper 22, a primary seat position sensor 44 to enable the displacement rate of seat 11 to be determined, an electronic controller 42 for performing the rate calculation and sending a control signal to said damper 22, and a wiring harness interconnecting these elements with each other and at least some of the components with a battery 21 or similar source of current.

Preferably, seat damper system 20 includes a ride mode switch 46 and a seat leveling switch 48. Ride mode switch may have any number of positions to manually change the algorithm parameters to adjust the controlled ride in accordance with the operator's wishes. However, three positions such as "soft", "medium" and "firm" have been found to be adequate without overwhelming the operator with too many choices. Other labels could be chosen for the positions such as "jockeying", "over-the-road" and "bobtail" or "performance", "sport" and "touring" depending on the particular usage. The values for each of these settings are preferably factory set but may be made to be operator adjustable, if desired.

The use of ride mode switch 46 permits the feel of the seat damping system to be adjusted to the preferences of the operator. As intimated by some of the position names, these choices may be use related or may be simply the ride feel preference of the operator. This manual adjustment of the feel alters the parameters stored in ROM which are chosen for application, those parameters including gain, filter frequency, and null band limits. The seat leveling switch 48, when activated, will cause the micro-processor 42 to maintain the seat at the level to which the seat is adjusted, regardless of the ride parameters trying to dislodge it.

Certain other optional sensors may provide additional features to the system or enable enhancements to the existing operational characteristics. For example, inputs from a brake sensor 50 and a clutch sensor 52 can be used to increase the damping force of the seat damper 22 during braking or shifting to prevent the seat from moving away from the accelerator, brake and clutch pedals which could otherwise cause loss of control. The seat occupant sensor 54 can be used to lower the seat when the operator lifts weight off the seat to exit, enabling an easier egress from the vehicle and releveling the seat to the desired position upon return to the vehicle.

Steering angle sensor 56 can provide input to the electronic controller 42 resulting in greater damping force when the sensor 56 indicates the vehicle is in a hard cornering condition. The gearshift position sensor 58 and speed sensor 60 can make adjustments to the damping system 20 depending upon the type of driving the operator is engaging in. For example, if the speed is low and the gear position is low, the seat may be set to the "jockeying" mode. If the gear position sensor 58 indicates the vehicle is in reverse, the seat height could be raised to provide better visibility out the rear of the vehicle. Finally, a rollover sensor 62 could be used to relax the damper and air spring to reduce the force applied to the seat to reduce the possibility that the operator would be pinned in the vehicle during a rollover accident.

The micro-processor controller 42 performs all of its calculations to determine an appropriate damping level and to determine the required current level needed in damper 22 to produce that level of damping using a particular control method. The particular seat damper system described above can employ any control method such as skyhook, or deflection control as disclosed and claimed in U.S. Pat. No. 5,276,623 to operate the system. However, a particularly effective control system employed with this apparatus and which may be used in other applications as well, is a rate control method. The particular steps used in implementing the rate control technique are flow charted in FIG. 4.

Figure 4:
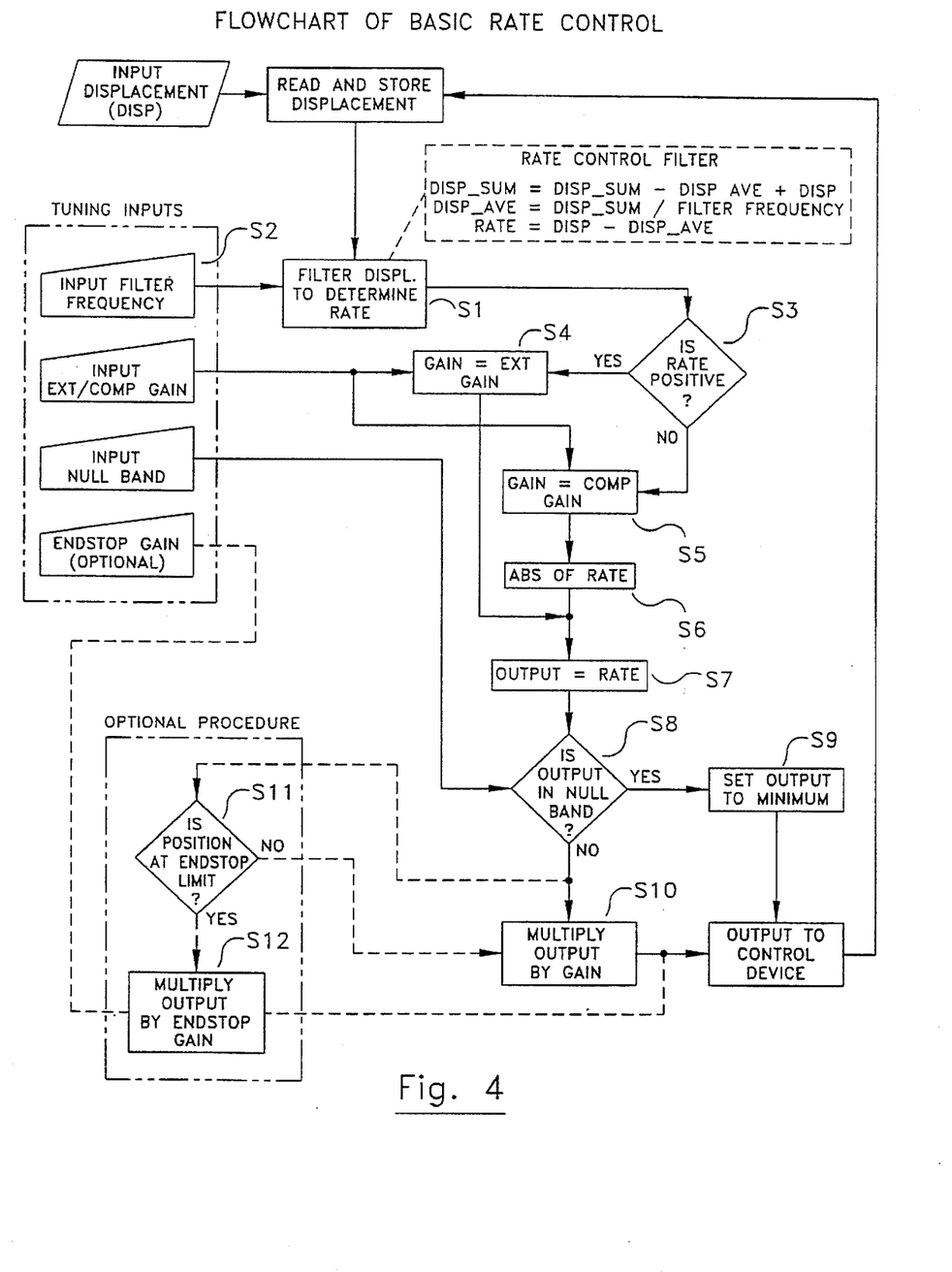
FIG. 4 is a diagrammatic depiction of the logic flow path for the rate control method of the present invention.

From successive readings taken from displacement sensor 44 (which may be sampled 200 or more times a second), the microprocessor 42 determines the rate and direction of the seat displacement. A filter within the microprocessor (which may be embodied in software, i.e., an algorithm, or in hardware) receives the successive displacement measurements and computes a rate of displacement (S1). Adjusting the input filter frequency is accomplished by adjusting an averaging time constant thereby tuning the controller to a desired ride feel (S2). The rate control filter determines the rate by computing the following values. The displacement sum, $S_{n+1}$, is equal to $S_n - D_{ave}$ (displacement average)+$D_n$ (displacement for the nth measurement), where $D_{ave}$ is equal to $S_{n+1}/F$ (filter frequency). The displacement rate, R, is equal to $D_n - D_{ave}$.

If the rate is positive (S3), that is, if the damper is extending, then the processor 42 sets the input gain to "extension gain" for later application (S4). If the rate is negative, that is, if the damper is experiencing a compressive stroke, then processor 42 sets the input gain to the "compression gain" (S5) that has been input which is typically a different value than the "extension gain". In addition, the processor takes the absolute value (S6) of the compressive rate, i.e., converts it to a positive value to establish the "output rate" (S7).

The "output rate" is then compared to the high and low values input into the null band (S8). If the output rate falls within the null band, then the output signal is set at its minimum value (e.g., "soft")(S9). It will be appreciated that since the null band is rate related, it is also dynamic, that is, it may move if the seat travels at a slow enough rate to not actuate the damper. If the output rate does not fall within the null band, the microprocessor 42 multiplies that rate by the gain (extension or compression) which it has previously selected to produce the resultant output signal (S10). The resultant output signal is then fed to the damper 22. The result of this process is to increase the output force of damper 22 to the value desired as determined by the values input for filter frequency and extension and compression gain.

Optionally, the microprocessor 42 may take the "output rate" and process it through an additional step to determine if the seat damper system is nearing an "end stop", i.e., if the piston 24 is approaching either end of its travel limit (S11). If displacement sensor 44 performs the check and determines that the piston is not nearing an end stop, the microprocessor reverts to its default process (S10), i.e., it multiplies the output rate by the appropriate (extension or compression) gain to produce the resultant output signal to be fed to the damper 22. If, on the otherhand, sensor 44 indicates an end stop is being approached, an alternate, typically higher gain value which has been manually input is used to boost said output rate (S12) to avoid a bottoming out of the damper 22. While the term "bottoming out" has been used here, it is intended that the end stop gain will prevent over extension as well as over compression of the damper. Further, while this gain has been described as having been manually set, this adjustment feature is designed to make the system more flexible and the setting will typically be done as part of the factory installation for the specific application, not by the operator.

Figure 5:
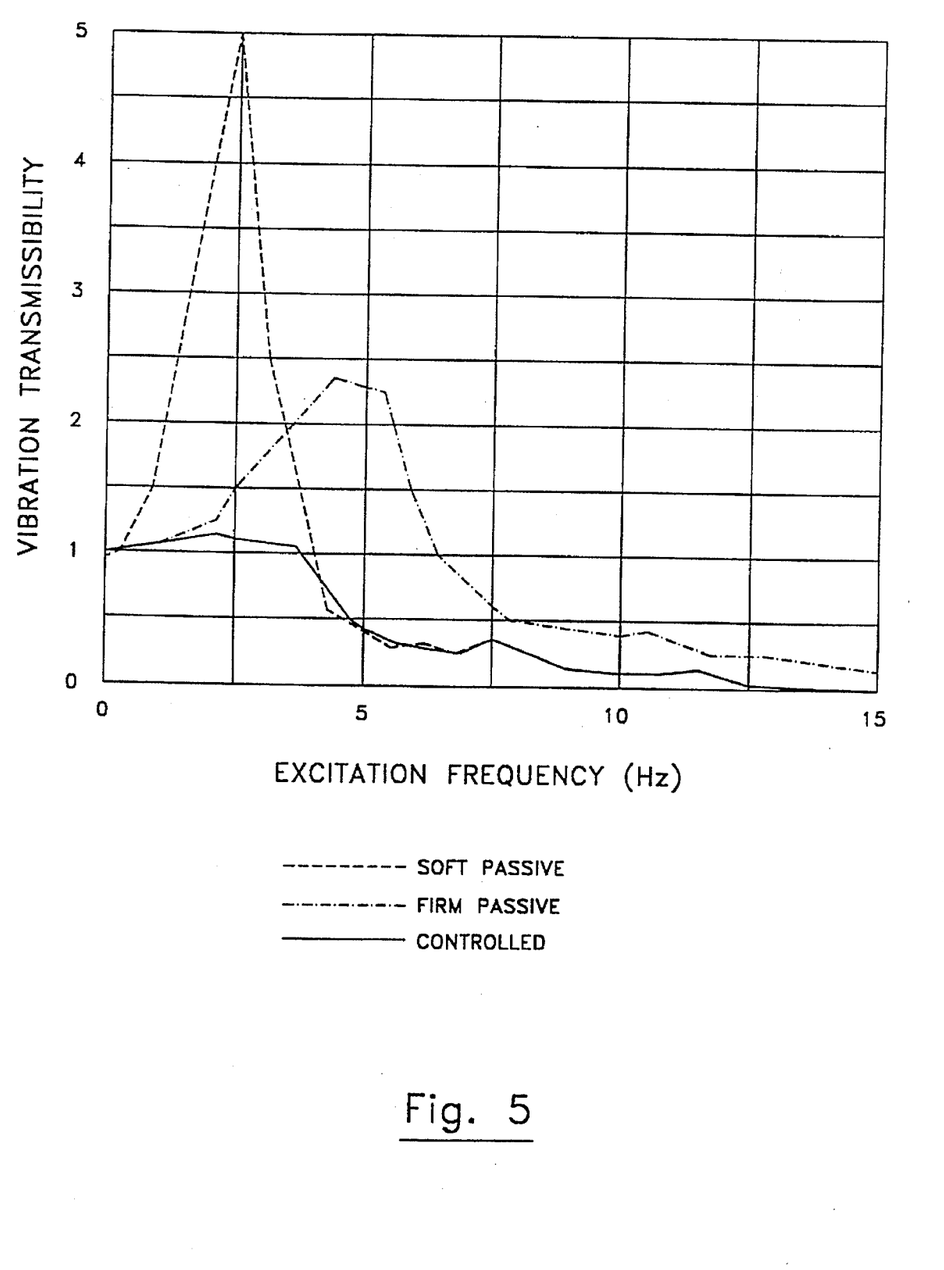
FIG. 5 is a plot of the controllable seat suspension system's response as compared to two passive systems.

FIG. 5 is a plot comparing the seat suspension system of the present invention to a soft passive damping system and a firm passive damping system. Each system was tested with the identical seat in order to produce proper comparative data. As can be seen, the soft passive system effectively isolates the operator from some of the higher frequency vibrations that were tested but has a significant transmissibility peak at the uncontrolled system's harmonic frequency. Because of its inherent stiffness, the firm passive system is less effective at isolating the higher frequency vibrations tested and, in fact, is less effective isolating at all frequencies with the exception of the soft system's harmonic. The damper system and control method of the present invention provide a transmissibility below I for all vibrational inputs above four Hz. This improved ride is beneficial not only to operator comfort but for safety, as well, since the operator is isolated from large amplitude vibrations which could cause her/him to lose control of the vehicle.

This particular rate control method can be implemented inexpensively as compared to say "skyhook" control and has proven to provide superior results to the deflection control method of the '623 patent. Various alternatives, modifications and substitutions will become apparent to one of ordinary skill in the art following a reading of the foregoing description. For example, although this system has been indicated as useful in Class 8 trucks and off-highway applications, obviously the system can also be used in automotive and marine applications. It is intended that all such alternatives, modifications and substitutions as fall within the scope of the appended claims be considered part of the present invention.

What is claimed is:

1. A controllable seat damper system for damping vibrations transmitted from a vehicle frame to a vehicle seat, said seat having a seat suspension including a support means and spring means to mount said seat on said frame, said controllable seat damper system comprising components a) a controllable damper interconnected between said seat and said frame in parallel with said seat suspension, said controllable damper including a magnetorheological fluid whose rheological properties can be changed by subjecting said fluid to a magnetic field which has variable strength in order to adjust a force output setting of said controllable damper continuously over a first desired range;

b) a single primary sensor connected to a portion of said seat suspension for monitoring a position of said seat;

c) an electronic controller for receiving a signal from said single primary sensor, said electronic controller introducing a control algorithm based solely on said signal from said single primary sensor to calculate an appropriate control signal to send to said controllable damper to adjust a strength of said magnetic field over a second particular range altering said rheological properties thereby changing said force output setting by said controllable damper over said first defined range;

d) a wiring harness interconnecting said sensor, said controller and said controllable damper with each other and at least one of said components with a power source thereby enabling current and data signals to be transmitted to and between the components, respectively.

2. The controllable seat damper system of claim 1 wherein said electronic controller filters an input from said primary sensor to determine a displacement rate, compares successive inputs from said primary sensor to determine if said displacement rate is positive or negative, derives an output signal equal to said displacement rate if said rate is positive and equal to said absolute value of said displacement rate if said rate is negative, and feeds said output signal to said damper to adjusts its force output setting.

3. The controllable seat damper system of claim 1 wherein said controllable damper comprises a cylinder connected to one of said seat and said frame and a piston slidable within said cylinder connected to the other of said seat and said frame, said piston defining first and second chambers within said cylinder.

4. The controllable seat damper system of claim 3 wherein said piston has an opening extending axially therethrough, and a magnetic field-generating coil at least partially surrounding said opening to alter said magnetorheological properties of said fluid.

5. The controllable seat damper system of claim 4 wherein said field-generating coil is a wound current-carrying coil which induces a magnetic field proportional to a magnitude of a current flow through said coil.

6. The controllable seat damper system of claim 3 wherein said controllable damper further comprises a secondary piston within said cylinder separating said controllable fluid from a pressurizable compartment.

7. The controllable seat damper of claim 1 further comprising secondary sensor means for providing information input to said electronic controller for secondary purposes.

8. The controllable seat damper of claim 7 wherein said secondary sensor means comprises at least one of a group including a brake sensor, a clutch sensor, a seat occupant sensor, a steering angle sensor, a gearshift position sensor, a speed sensor and a rollover sensor.

9. The controllable seat damper of claim 1 furrier comprising a ride mode switch which may be manually set by an operator to one of three positions representative of controlled soft, medium and firm rides, said controller selecting a group of ride parameters to be applied in conjunction with a setting of said ride mode switch and overriding said manual setting upon occurrence of certain predetermined conditions.

10. The controllable seat damper of claim 1 further comprising a seat leveling switch which, when engaged, causes said controllable seat damper system to maintain said seat at a uniform seat height.

11. A rate-control method of controlling a controllable damper system, said method comprising the steps of a) sensing a first displacement of said damper system;

b) feeding said first displacement to a controller;

c) sensing a subsequent displacement of said damper system;

d) feeding said subsequent displacement to said controller;

e) processing said first and subsequent displacements through a filter within said controller to determine a displacement rate of said damper system;

f) determining whether said displacement rate is positive or negative;

g) setting an input gain to a desired extension gain if said rate is positive and to a desired compression gain if said rate is negative;

h) deriving an output signal equal to said displacement rate if positive and equal to an absolute value of said displacement rate if negative;

i) comparing said output signal to a preset null band to determine if said signal falls within said null band;

j) setting an output control signal to a minimum value if said output signal is within said null band and multiplying said output signal by the appropriate gain set in step g) if it is not;

k) feeding said output control signal to a controllable damper to adjust its force output setting to an appropriate value.

12. The rate-control method of claim 11 further comprising the steps of l) determining if said displacement of said damper is within an end stop limit;

m) if so, multiplying said output signal by a preset end stop gain to produce an alternate output control signal;

n) feeding said alternate output control signal to said controllable damper to adjust its force output setting to an appropriate higher value to reduce end stop collisions.

13. The rate-control method of claim 12 further comprising the step of setting said preset end stop gain to a desired level to produce the desired damping when implemented.

14. The rate-control method of claim 11 further comprising the steps of inputting an upper limit and a lower limit on said preset null band.

15. The rate-control method of claim 11 further comprising the step of adjusting an input filter frequency to control the lowest frequency encountered by said system to be handled by the system.

16. The rate-control method of claim 15 wherein said step of adjusting said input filter frequency is accomplished by adjusting an averaging time constant thereby tuning said controller to a desired ride feel.

17. A rate-control method of controlling a controllable seat damper system, said method comprising the steps of a) sensing a first displacement of a seat;

b) feeding said first displacement to a controller;

c) sensing a subsequent displacement of said seat;

d) feeding said subsequent displacement to said controller;

e) processing said first and subsequent displacements through a filter within said controller to determine a displacement rate of said seat;

f) determining whether said displacement rate is positive or negative;

g) setting an input gain to a desired extension gain if said rate is positive and to a desired compression gain if said rate is negative;

h) deriving an output signal equal to said displacement rate if positive and equal to an absolute value of said displacement rate if negative;

i) comparing said output signal to a preset null band to determine if said signal falls within said null band;

j) setting an output control signal to a minimum value if said output signal is within said null band;

k) if said output signal is not within said null band, determining if said displacement of said damper is at an end stop limit;

l) if so, multiplying said output signal by a preset end stop gain to produce an output control signal;

m) if said output signal is not at said end stop limit, multiplying said output signal by the appropriate gain set in step g) to produce an output control signal;

n) feeding said output control signal created during step j), l) or m) to a controllable damper to adjust its force output setting to an appropriate value to damp an induced movement of said seat.

18. The rate-control method of claim 17 wherein said output control signal adjusts a relative strength of an induced field to vary the rheological fluid properties of a controllable fluid in said controllable damper in order to adjust said force output setting.

19. The rate-control method of claim 17 further comprising the step of adjusting an input filter frequency to control the lowest frequency encountered by said system to be handled by the system.

20. The rate-control method of claim 19 wherein said step of adjusting said input filter frequency is accomplished by adjusting an averaging time constant thereby tuning said controller to a desired ride feel.

* * * * *

UNITED STATES PATENT AND TRADEMARK OFFICE
CERTIFICATE OF CORRECTION

PATENT NO. : 5,652,704
DATED : July 29, 1997
INVENTOR(S) : David M. Catanzarite

It is certified that error appears in the above-indentified patent and that said Letters Patent is hereby corrected as shown below:

In the abstract, Column 2, after "damper", delete "to".

In the claims, Column 6, Line 12, the portion reading "adjusts" should read -adjust-. In column 6, Line 39, the portion reading "furrier", should read -further-.

Signed and Sealed this

Seventh Day of December, 1999

Attest:

Q. TODD DICKINSON

Attesting Officer

Acting Commissioner of Patents and Trademarks